United States Patent [19]

Legge

[11] Patent Number: 4,765,309

[45] Date of Patent: Aug. 23, 1988

[54] SOLAR TRACKING DEVICE

[76] Inventor: Frank M. Legge, 26 Surrey Road, Wilson, Australia

[21] Appl. No.: 46,876

[22] PCT Filed: Jul. 24, 1986

[86] PCT No.: PCT/AU86/00211

§ 371 Date: Apr. 21, 1987

§ 102(e) Date: Apr. 21, 1987

[87] PCT Pub. No.: WO87/00608

PCT Pub. Date: Jan. 29, 1987

[30] Foreign Application Priority Data

Jul. 24, 1985 [AU] Australia .............................. PH1608

[51] Int. Cl.⁴ ................................................. F24J 2/38
[52] U.S. Cl. ..................................... 126/425; 126/424; 126/419
[58] Field of Search ............... 126/424, 425, 419, 438, 126/439, 451, 417; 250/203 R; 353/3; 60/531, 675, 641

[56] References Cited

U.S. PATENT DOCUMENTS

| | | | |
|---|---|---|---|
| 4,175,391 | 11/1979 | Baer | 126/424 |
| 4,275,712 | 6/1981 | Baer | 126/425 |
| 4,349,011 | 9/1982 | Hartsog | 126/419 |
| 4,476,854 | 10/1984 | Baer | 126/424 |
| 4,505,255 | 3/1985 | Baer | 126/425 |

FOREIGN PATENT DOCUMENTS 3303000 8/1984 Fed. Rep. of Germany ...... 126/425

Primary Examiner—James C. Yeung
Attorney, Agent, or Firm—Harness, Dickey & Pierce

[57] ABSTRACT

A solar tracking device for causing a solar collector to track the sun during the course of the day and for automatically reorienting the collector to the east at the end of the day. The device (11) includes a pivotal support (13, 17) having a center of gravity below the pivot axis 16. The device further includes closed containers (25, 27) being an eastern container (25) and a western container (27). The closed containers (25, 27) are interconnected for fluid communication therebetween and contain a volatile fluid. The containers are mounted on the pivotal support (13, 17) one on each side of the pivot axis (16). A shading means (31, 32) is provided for shading the container nearer the sun more than the container further from the sun to provide unequal solar radiation on the containers when the rays of the sun are not at a predetermined relation to the containers thereby causing fluid transfer between the containers and rotation of the containers and the support about the pivot axis until equal radiation is received by both containers. The containers (25, 27) are so positioned relative to each other that the western container (27) is higher than the eastern container (25) when the device is at the rotational position which it assumes at midday.

12 Claims, 4 Drawing Sheets

SOLAR TRACKING DEVICE

This invention relates to a solar tracking device for causing a solar energy collector to follow the sun from east to west during the course of a day so as to maintain a position close to optimum with respect to the sun and for reorientating the collector to the easterly direction at the end of the day ready for sunrise on the following morning.

Numerous tracking devices have been developed to cause solar energy collecting devices to follow the sun from east to west during the course of a day so as to allow the solar energy collecting devices to operate most efficiently by increasing both total output and uniformity of output. Many such tracking devices are of complex construction and require an external energy supply and as a result are not cost-effective.

A simple tracking device which operates without relying either on an external energy supply or on energy gathered by the collector itself, is described in U.S. Pat. No. 2,999,943 to C. W. Geer. In that solar tracking device, a pair of containers are interconnected and sealed so as to form a closed system which is partially filled with a volatile liquid. The containers are supported on a pivotal platform which also carries a solar radiation collector, the containers being disposed opposite one another one to each side of the pivot axis. The containers have shades which are so arranged that when the rays of the sun are normal to the surface of the collector, the containers receive equal amounts of solar radiation. When, owing to westerly movement of the sun, the rays are no longer normal to the collector surface, the shades allow the container that is farther from the sun to receive a larger amount of radiation than the container which is closer to the sun, thereby producing a temperature differential between the two containers. The temperature differential between the two containers results in a transfer of liquid to the cooler container which in turn alters the static balance of the device thereby causing rotation of the device until the temperature differential is eliminated. In this way, the device follows the sun from east to west during the course of the day. At the commencement of the day and throughout the morning the device is in an easterly-facing direction and hence the eastern container is lower than the western container. The two containers are at the same height when the device attains the central position at midday and in the afternoon thereafter the device assumes a westerly-facing direction in which the western container is lower than the eastern container. At the end of the day, the device stays in the westerly-facing direction and is required to be manually reoriented to the easterly-facing direction. If the device is not manually reoriented, it would remain in the westerly-facing direction until such time as the sun rose sufficiently high in the east to shine over the eastern shade to strike the western container and thus the benefit of many hours of sunlight would be lost.

While not specifically disclosed in the Geer patent, the two containers will have unequal cooling rates if the sun is obscured when the device has tracked to a tilted position. This is because the lower container contains more liquid than the higher container and therefore has greater thermal mass and must cool more slowly. The differential cooling rates provide a tendency for fluid transfer from the lower container to the higher container owing to the lower pressure of vaporised liquid in the higher container. Such tendency for fluid transfer is opposed by the head of the volatile liquid in the closed system. If fluid transfer should take place, it would have the effect of altering the static balance of the device so as to cause the device to commence to tilt towards the central position. The tendency for the liquid to move to the higher container would however be eliminated if the device approached the central position as at this point the containers would now hold equal quantities of liquid and would therefore cool at equal rates. Consequently, the device would not pass through the central position, but would instead tip back to the westerly-facing direction under the effect of gravity on the liquid. However, in practice it is most unlikely that the differential cooling rates in this instance would effect sufficient fluid transfer to even commence return movement of the device in the eastward direction.

To eliminate the need for daily manual reorientation of the device to the east, the concept of regulating the rates of cooling of the two containers was introduced in U.S. Pat. No. 4,175,391 to S. Baer. In the Baer solar tracking device, the containers are provided with differential insulation or other means to enhance differential cooling between the containers thereby providing further inducement for fluid to be transferred from the western container to the eastern container at the end of the day. Provided acquisition of sufficient heat is not impeded by atmospheric conditions, a sufficient temperature differential will be generated between the containers on rapid cooling to enable the device to pass through the central position and return to the easterly-facing position in readiness for the reappearance of the sun on the following morning. However, such a solar tracking device does suffer from two deficiencies which become apparent under certain atmospheric conditions. First, if the atmospheric conditions are such that the containers absorb insufficient heat or cool slowly (for example in situations where the intensity of the sun declines gradually owing to a hazy sky), there may be insufficient temperature differential on cooling at sunset to overcome the effect of gravity on the liquid, as the western container is appreciably lower than the eastern container at the end of the day. Consequently, reorientation to the easterly direction will not occur. In such circumstances, a considerable amount of morning sunlight will be wasted if the solar tracking device is not manually reset. Secondly, if the sun is obscured for a period of time owing to cloud, the Baer solar tracking device will orient itself to the east during the morning and may do so in the afternoon. However, around equinox, if the sun reappears a little after midday, the western shade will prevent the sun from shining on the eastern container and so the solar tracking device will not align itself in the direction of the sun and so the remaining sunlight for the day is lost.

It is a principal object of this invention to provide a solar tracking device which reorients itself itself to the east in the absence of sunlight regardless of atmospheric conditions.

It is a further, but only preferred, object of this invention to provide a solar tracking device which can re-align itself to the sun regardless of the relative positions of the device and the sun.

Briefly, the principal object of the invention is met by mounting the containers relative to one another such that the western container is higher than the eastern container when the device is at the rotational position which it assumes at midday.

As a consequence of such arrangement, the device assumes a threshold rotational position in which the two containers are at the same level, some time after midday. When the containers are at this threshold level, the western container must contain volatile liquid than the eastern container and will have absorbed a considerable amount of heat energy. This factor provides the solar tracking device according to the present invention with an inherent tendency to automatically reorient to the east, as will now be explained. After the solar tracking device has passed through the threshold rotational position during its westward movement, the western container is lower than the eastern container. The head of fluid will therefore tend to oppose transfer of liquid from the western container to the eastern container at sunset or in other circumstances where solar radiation incident on the containers is interrupted. However, because the western container now holds more fluid than the eastern container it will cool at a slower rate than the eastern container and so fluid will transfer from the western container to the eastern container. The resultant shift in the centre of gravity rotates the device eastward. The proportions of the device can be so chosen that if sufficient heat is absorbed to tilt the device fully to the west, there will be sufficient fluid transfer on cooling to return the device to the threshold position in which the two containers are at the same level. Unlike the previously described prior art devices, the western container contains more fluid than does the eastern container when at the threshold position, consequently fluid transfer to the eastern container due to cooling continues so as to move the device eastward past the threshold position. Once the device is past the threshold position, the effect of gravity on the liquid ensures that the device completes its movement eastward.

Accordingly, in one form the invention resides in a solar tracking device comprising a pivotal support having a centre of gravity below the pivot axis, a pair of closed containers being an eastern container and a western container, the closed containers being interconnected for fluid communication threrebetween and containing a volatile fluid, the containers being mounted on the pivotal support one on each side of the pivot axis, shading means for shading the container nearer the sun more than the container further from the sun to provide unequal solar radiation on the containers when the rays of the sun are not at a predetermined relation to the containers thereby causing fluid transfer between the containers and rotation of the containers and the support about the pivot axis until equal radiation is received by both containers, wherein the containers are so positioned relative to each other that the western container is higher than the eastern container when the device is at the rotational position which it assumes at midday.

With said further (preferred) object in view, it is preferable that the two containers are offset from one another along the pivot axis to an extent which ensures that there is no position of the device relative to the sun in which excessive shading of the eastern container will occur. This ensures that the device will realign with the sun in circumstances where the sun reappears after being obscured for a lengthy period of time. With this arrangement, it is preferred that the containers are so positioned relative to each other that when the pivot axis is positioned substantially parallel to the rotational axis of the earth, the eastern container is closer to the equator than the western container. In this way, the western container is at a higher level than the eastern container at latitudes other than those at or near the equator.

Preferably, the containers are elongated and positioned so as to extend generally in the direction of the pivot axis.

Preferably, the shading means comprises a pair of shades being an eastern shade associated with the eastern container and a western shade associated with the western container. Preferably, each shade extends upwardly from a position at the side of the container remote from the pivotal axis to a position over the container. The western shade should also extend downward sufficiently to shade the container if, due to prolonged cloud, the device is rotated fully east and the sun comes out late in the day.

Preferably, the western shade has a portion transparent to solar radiation. The solar radiation transparent portion of the western shade may merely be defined by a cut-out portion formed in the shade.

Preferably, the eastern shade has a reflective surface facing the eastern reservoir.

Preferably, a reflective surface is positioned below the eastern container to reflect solar radiation onto the container. Conveniently, the reflective surface is provided on an extension of the shade.

Preferably, each reservoir is provided with a shielding means transparent to solar radiation but resistant to air flow.

The invention will be better understood by reference to the following description of one specific embodiment thereof as shown in the accompanying drawings in which.

Figure 1:
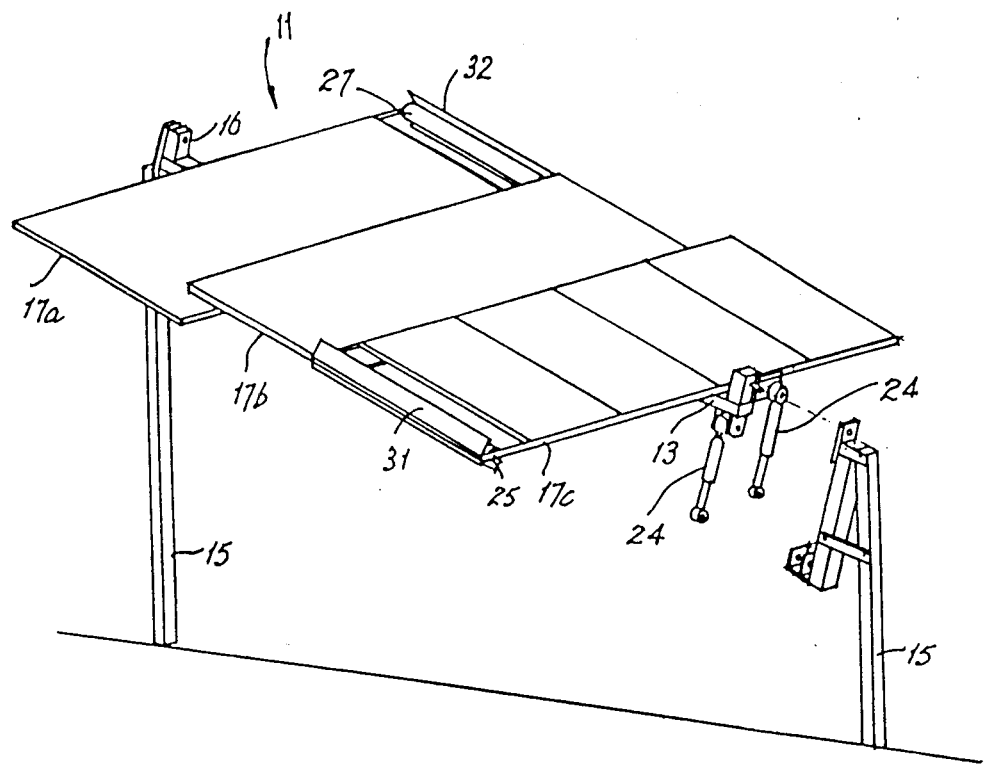
FIG. 1 is a perspective view of a solar energy collector incorporating a solar tracking device according to the invention.

The solar energy collecting device shown in the drawings is constructed for use in the southern hemisphere.

The solar energy collecting device 11 comprises a beam 13 which is supported at its ends on support posts 15 for rotation about a longitudinal pivot axis 16. The beam 13 is installed so as to extend in a generally north-/south direction and is inclined to the horizontal with the lower end towards the equator, the extent of the inclination being approximately equal to the latitude of the site at which the collector is positioned.

Figure 3:
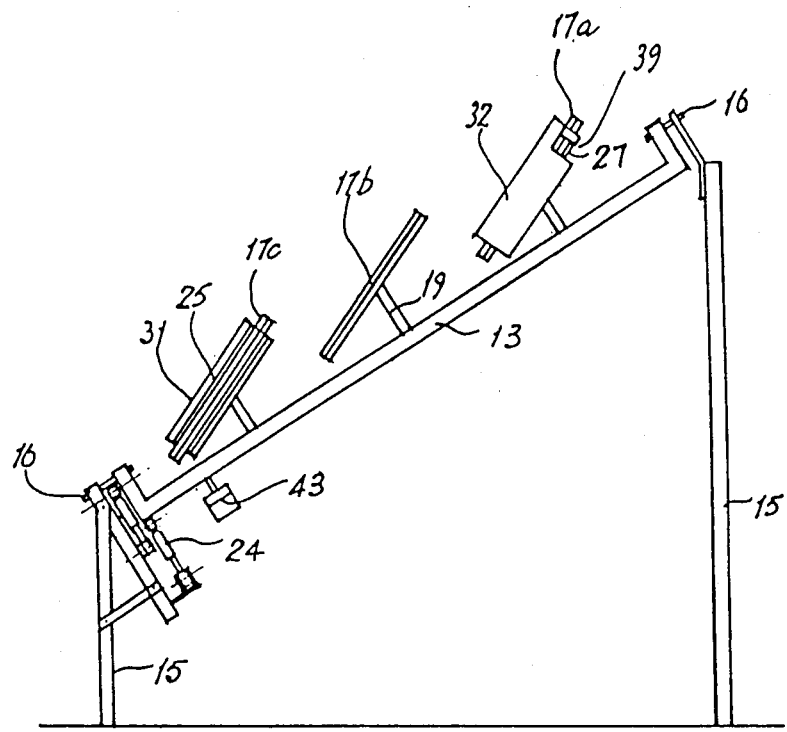
FIG. 3 is a side elevational view of the solar energy collector of FIG. 1.
Figure 4:
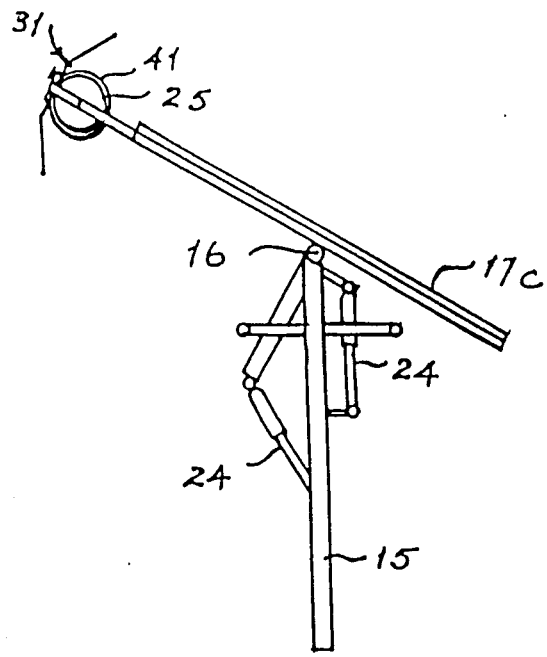
FIG. 4 is an end view of the solar collector of FIG. 1 in a westerly-facing position, showing only the eastern container.
Figure 5:
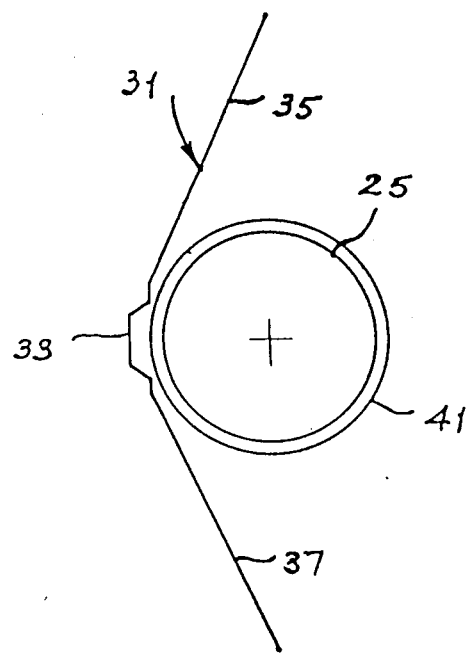
FIG. 5 is a detailed view showing the eastern container and its associated shade and shield.

A plurality of rectangular panels 17 is supported on the beam 13 along the length thereof, there being three panels in this embodiment namely an upper panel 17a, and intermediate panel 17b and a lower panel 17c. Each panel 17 is supported on an upstanding support 19 the lower end of which is mounted on the beam, as shown in FIG. 3 of the drawings. An array of solar modules 21 is carried on each panel. The panels are so mounted as to be capable of rotation about an east/west axis through an angle of 23.5° in either direction to permit manual adjustment to accommodate seasonal changes in the position of the sun.

Damping means are provided for damping the effects of external forces (such as wind) tending to cause pivotal movement of the collector about the pivot axis 16. The damping means in this embodiment is in the form of a pair of dampers 24 acting between the beam 13 and one support post 15.

The solar energy collector is provided with a solar tracking device for causing the collector to rotate about the pivot axis 16 of the beam 13 so as to follow the sun during the course of the day. The solar tracking device comprises a pair of elongated containers being an eastern container 25 and a western container 27. The containers 25 and 27 are interconnected for fluid communication therebetween and form a closed system which is partially filled with a volatile liquid such as Freon 12. The volume of volatile liquid contained in the closed system is approximately equal to the capacity of one container.

Figure 2:
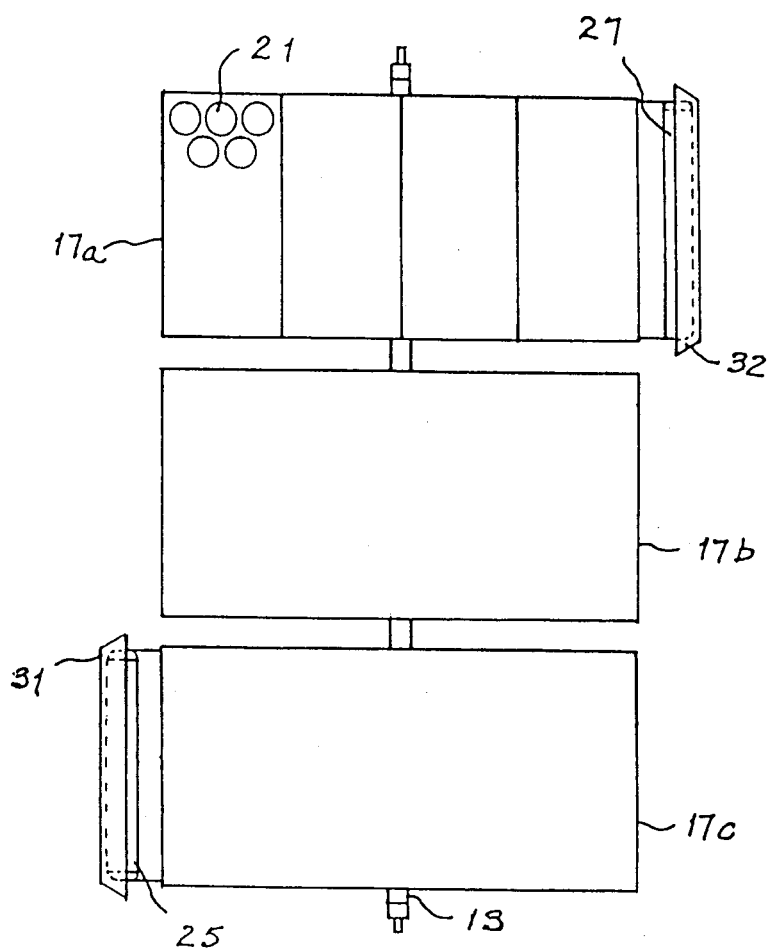
FIG. 2 is a plan view of the solar collector of FIG. 1.

The eastern container 25 is mounted close to the eastern edge of the lower panel 17c and the western container 27 is mounted close to the western edge of the upper panel 17a. In this way, the two containers are offset from each other in the direction of the pivot axis, with the western container being higher than the eastern container when the device is in the position which it assumes at midday (as shown in FIGS. 1, 2 and 3).

A shading means is provided for shading the particular container nearer the sun more than the container further from the sun to provide unequal solar radiation on the container when the sun's rays are not at a predetermined relation to the container. Specifically, the shading means comprises a pair of shades being an eastern shade 31 providing shade to the east side of the eastern container 25 and a western shade 32 providing shade to the west side of the western container 27. The shades 31 and 32 are so arranged that the containers receive equal amounts of solar radiation when the panels 17 are aimed directly at the sun and unequal amounts of solar radiation in other circumstances. The shades 31, 32 are elongated and extend along the length of the containers. Each shade comprises a central section 33 and upper marginal section 35. The central section 33 of each shade is positioned to the side of the respective container remote from the pivot axis 16 and the upper marginal section 35 extends from the central section 33 to a position above the respective container. Each shade is provided with an extension in the form of a lower marginal section 37 which extends from the bottom edge of the central section 33 to a position below the respective reservoir. The lower marginal section 37 of the eastern shade is provided with a reflective surface underlying the container.

The western shade 32 is provided with a portion 39 which is transparent to solar radiation to ensure that the western reservoir receives some solar radiation towards the end of the day, the purposee of which will be explained later. In this embodiment, the transparent portion 39 of the western shade is in the form of cut-out portion in the shade.

Operation of the solar tracking device will now be described. In the early morning, the solar collector is in an easterly-facing direction and consequently the eastern container 25 is lower than the western container 27. As the sun rises, the western container 27 is initially exposed to the sun and hence is heated. The eastern container 25 is shielded from the early morning sun rays by the eastern shade. Since the eastern container is shielded from the sun's rays and the western container is exposed to the sun's rays, there is differential heating of the containers with the western container 27 absorbing more heat. However, because the eastern container 25 is lowermost it is already filled with the volatile liquid; no fluid transfer takes place. Consequently, the solar collector remains tilted in the easterly-facing direction. This situation remains until the westward movement of the sun results in more shade falling on the western container than on the eastern container thereby eventually reversing the temperature differential and resulting in the transference of volatile liquid from the eastern container to the western container. The mass transfer of liquid to the western container causes a change in the static balance of the collector and hence rotation of the collector in the westerly direction until both containers are heated evenly by equal exposure to the sun's rays thereby eliminating the temperature differential. In this way, the solar tracking device causes the collector to follow the sun throughout the course of the day. Because of the relative heights of the eastern and western containers, it is well into the afternoon before the two reservoirs attain the same height (referred to as the threshold position), typically 2 p.m. in this embodiment. By that time, more than half the fluid in the closed system has been transferred to the western container and that container has absorbed a considerable quantity of heat. The solar tracking device continues to follow the sun until such time as it arrives at the western extent of its permitted movement at which time the eastern container is substantially empty. As the eastern container 25 now contains less fluid than the western container, it must cool more rapidly than the western container when the sun sets or is obscured. On cooling of the eastern container 25, there is a mass transfer of volatile fluid from the western container to the eastern container to commence pivotal movement of the collector in the easterly direction for reorientation of the collector ready for sunrise on the following day. The mass transfer of volatile fluid carries the collector to the threshold position in which the container are at equal height. At that stage, the western container still contains more liquid than the eastern container and hence will continue to cool more slowly and thereby maintain the temperature differential which continues to cause liquid to transfer to the eastern container. Consequently, the device passes through the threshold position and thereafter fluid transfer is assisted by gravitational effects on the fluid as the device proceeds towards the eastern extent of its movement.

The cut-out portion 39 in the western shade 32 allows the western container 27 to receive a limited amount of solar radiation after the collector has reached the western extent of its movement. While this serves no useful purpose during the relatively short days of winter when the sun would set soon after the collector has reached the western extent of its movement, it is useful during summer, when, owing to the longer days sunlight would continue for some time after the collector had reached the western extent of its movement. If it were not for the cut-out portion, the western container 27 would be completely shaded for a considerable period of time before sunset whereby the container might cool to an extent which would prevent reorientation of the collector to the easterly-facing direction. The cut-out portion 39 therefore allows the western container 27 to receive limited solar radiation so as to ensure that it does not suffer an undesirable amount of heat loss. The presence of the cut-out portion 39 may be detrimental to the performance of the tracking device in circumstances where the sun reappears late in the day after being obscured for a prolonged period, as it would reduce differential heating of the containers. Care should therefore be taken to ensure that no more than half the length of the eastern container can be shaded by any part of the device (other than the eastern shade) in the most unfavourable position of the device and of the sun. It is also desirable to provide a reflector beneath the eastern container to assist realignment from the most unfavourable situation.

To enhance the precision of tracking, it is desirable to protect the containers from the influence of prevailing winds. This is because the performance of the containers depends on the balance between heat input and heat loss, the latter being by way of conduction and radiation. Heat loss in the conduction mode is affected by wind velocity and since the wind velocity may not be equal over both containers, it is desirable to restrict the extent of heat loss from the containers through the conduction mode and allow the major part of the heat loss to be by way of the radiation. To this end, each container is surrounded by a shield 41 which is transparent to both sunlight and infra-red radiation, but which protects the containers from direct exposure to wind. The shields 41 provide a further benefit in that their presence causes the containers to operate at higher temperatures thereby providing more energy for reorientation of the collector from the westerly direction to the easterly direction at sunset.

In order to reduce the effect of prevailing winds on the collector in terms of its tracking precision, it is desirable to have the centre of wind resistance of the collector as close to the pivot axis 16 as is possible. The collector may be provided with a wind vane 43 for such purpose.

From the foregoing it is evident that the present invention provides a relatively simple and effective solar tracking system which can automatically reorient to the east at the end of each day in preparation for sunrise on the following morning.

It should be appreciated that the scope of the invention is not limited to the scope of the embodiment described. In particular, it should be understood that a solar tracking device according to the invention may be used with a solar collector of any kind.

The claims defining the invention are as follows:

1. A solar tracking device comprising a pivotal support having a centre of gravity below the pivot axis which in use is set substantially parallel with the axis of the earth, a pair of closed containers being an eastern container and a western container, the closed containers being interconnected at or near the lower ends thereof for fluid communication therebetween and containing a volatile fluid, the containers being mounted on the pivotal support, shading means fixed relative to the containers for shading the container nearer the sun more than the container further from the sun to provide unequal solar radiation on the containers when the rays of the sun are not at a predetermined relation to the containers thereby causing fluid transfer between the containers and rotation of the containers and the support about the pivot axis until equal radiation is received by both containers, wherein the containers are so positioned relative to each other than the western container is offset in an upward vertical direction with respect to the eastern container when the device is at the rotational position which it assumes at midday, the extent of said vertical offset being such that the sufficient fluid transfer from the western container to the eastern container will always occur to bring about reorientation to the east when the sun sets or is obscured.

2. A solar tracking device according to claim 1 wherein said vertical offset between the two containers is provided by offsetting the containers from one another along the pivot axis.

3. A solar tracking device according to claim 2 wherein the extent of the offset along the pivot axis is sufficient to at least reduce shading of one container by the other container.

4. A solar tracking device according to claim 1 wherein the containers are mounted on the pivotal support one on each side of the pivot axis.

5. A solar tracking device according to claim 1 wherein the containers are elongated.

6. A solar tracking device according to claim 1 wherein the shading means comprises a pair of shades being an eastern shade associated with the eastern container and a western shade associated with the western container, each shade extending upwardly from a position at the side of the container remote from the pivotal axis to a position over the container.

7. A solar tracking device according to claim 6 wherein the western shade has a portion transparent to solar radiation.

8. A solar tracking device according to claim 7 wherein the transparent portion comprises a cut-out portion formed in the shade.

9. A solar tracking device according to claim 6 wherein there is a further shade associated with the western container, said further shade extending downwardly from a position at the side of the western container remote from the pivotal axis.

10. A solar tracking device according to claim 6 wherein the eastern shade is provided with a reflective surface on the inner face thereof.

11. A solar tracking device according to claim 10 wherein the reflective surface extends below the eastern container to reflect solar radiation onto the container.

12. A solar tracking device according to claim 1 wherein each container is provided with a shielding means transparent to solar radiation but resistant to air flow.

* * * * *